United States Patent
Jiang et al.

(10) Patent No.: US 10,085,287 B2
(45) Date of Patent: *Sep. 25, 2018

(54) METHOD, DEVICE, AND SYSTEM FOR DETERMINING TIMING ADVANCE GROUPING

(71) Applicant: Huawei Technologies Co., Ltd., Shenzhen (CN)

(72) Inventors: Yi Jiang, Shenzhen (CN); Zhongbin Qin, Shenzhen (CN); Yinghui Yu, Beijing (CN); Junren Chang, Beijing (CN); Mingzeng Dai, Shanghai (CN); Guanglin Han, Beijing (CN); Wei Quan, Beijing (CN); Jian Zhang, Beijing (CN); Qiao Zhang, Shenzhen (CN); Yajuan Li, Beijing (CN); Boyun Xie, Xi'an (CN); Yi Guo, Shanghai (CN); Pingping Xing, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 323 days.

This patent is subject to a terminal disclaimer.

(21) Appl. No.: 14/617,642

(22) Filed: Feb. 9, 2015

(65) Prior Publication Data
US 2015/0156798 A1  Jun. 4, 2015

Related U.S. Application Data

(63) Continuation of application No. 13/548,145, filed on Jul. 12, 2012, now Pat. No. 8,983,517, which is a
(Continued)

(30) Foreign Application Priority Data

Jan. 12, 2010 (CN) .......................... 2010 1 0000583

(51) Int. Cl.
H04J 3/00 (2006.01)
H04W 74/08 (2009.01)
(Continued)

(52) U.S. Cl.
CPC ..... *H04W 74/085* (2013.01); *H04W 56/0005* (2013.01); *H04W 56/0045* (2013.01);
(Continued)

(58) Field of Classification Search
CPC .............. H04W 76/046; H04W 76/04; H04W 56/0005; H04W 56/0045; H04W 72/04;
(Continued)

(56) References Cited

U.S. PATENT DOCUMENTS 8,902,811 B2 * 12/2014 Baldemair .............. H04L 5/001
370/324
2009/0029715 A1   1/2009 Burchardt
(Continued)

FOREIGN PATENT DOCUMENTS

CN          1581991 A       2/2005
CN        101198155 A       6/2008
(Continued)

OTHER PUBLICATIONS

3rd Generation Partnership Project; Technical Specification Group Radio Access Network; Evolved Universal Terrestrial Radio Access (E-UTRA) Medium Access Control (MAC) protocol specification (Release 9), 3GPP TS 36.321, V9.1.0, Dec. 2009, 46 pages.
(Continued)

*Primary Examiner* — Sai Ming Chan
(74) *Attorney, Agent, or Firm* — Slater Matsil, LLP

(57) ABSTRACT

Embodiments of the present invention provide a method, a device, and a system for determining timing advance grouping. In one embodiment, a base station adds a component carrier (CC) for a user equipment (UE). The base station
(Continued)

determines a timing advance (TA) group to which the added CC belongs. The TA group is a set of CCs that can share a TA. The base station sends identification information that identifies the TA group to the UE.

21 Claims, 10 Drawing Sheets

Related U.S. Application Data continuation of application No. PCT/CN2011/070199, filed on Jan. 12, 2011.

(51) Int. Cl.
*H04W 56/00* (2009.01)
*H04W 72/04* (2009.01)
*H04W 74/00* (2009.01)
*H04W 76/27* (2018.01)

(52) U.S. Cl.
CPC ..... *H04W 72/0446* (2013.01); *H04W 74/006* (2013.01); *H04W 76/27* (2018.02); *H04W 74/0833* (2013.01)

(58) Field of Classification Search
CPC ........... H04W 74/085; H04W 72/0446; H04W 74/006; H04W 76/27
USPC ........................................................ 370/336
See application file for complete search history.

(56) References Cited

U.S. PATENT DOCUMENTS

| | | | |
|---|---|---|---|
| 2011/0038280 A1* | 2/2011 | Jung | H04W 76/02 370/254 |
| 2011/0103332 A1* | 5/2011 | Kuo | H04L 5/001 370/329 |
| 2011/0199988 A1 | 8/2011 | Yang et al. | |
| 2012/0008600 A1* | 1/2012 | Marinier | H04L 5/001 370/336 |
| 2012/0113939 A1* | 5/2012 | Kim | H04W 74/006 370/329 |
| 2012/0170570 A1* | 7/2012 | Chang | H04W 56/005 370/350 |
| 2014/0010191 A1 | 1/2014 | Nakao | |
| 2016/0150571 A1* | 5/2016 | Pelletier | H04W 74/002 370/329 |

FOREIGN PATENT DOCUMENTS

| | | |
|---|---|---|
| CN | 101473562 A | 7/2009 |
| CN | 101473663 A | 7/2009 |
| CN | 101588629 A | 11/2009 |
| CN | 101646234 A | 2/2010 |
| EP | 2472965 A1 | 7/2012 |
| WO | 2011032308 A1 | 3/2011 |
| WO | 2011050535 A1 | 5/2011 |

OTHER PUBLICATIONS

Huawei, "Issues in carrier aggregation," 3GPP TSG RAN WG1 Meeting #57bis, R1-092377, Los Angeles, USA, Jun. 29-Jul. 3, 2009, 6 pages.

Khanderkar, A., "Reply LS Timing Advance for Carrier Aggregation in LTE-A," 3GPP TSG RAN WG1 Meeting #59, R1-095057, Jeju, Korea, Nov. 9-13, 2009, 1 page.

Palanki, R., "Reply LS on RAN2 Status on Carrier Aggregation," 3GPP TSG RAN WG2 Meeting #67bis, R2-095422, Miyazaki, Japan, Oct. 12-16, 2009, 3 pages.

TSG-RAN WG4, "Reply LS on RAN2 status on carrier aggregation," 3GPP TSG RAN WG2 Meeting #67bis, R2-095422, Miyazaki, Japan, Oct. 12-16, 2009, 4 pages.

Huawei, "Different Timing Advance Impact on Carrier Aggregation," 3GPP TSG RAN WG2 Meeting #67bis, R2-095815, Miyazaki, Japan, Oct. 12-16, 2009, 3 pages.

Nokia Corp., et al., "RACH and carrier aggregation," 3GPP TSG-RAN WG2 Meeting #68, R2-096844, Jeju, South Korea, Nov. 9-13, 2009, 4 pages.

"Reply LS on timing advance for carrier aggregation in LTE-A," 3GPP TSG RAN WG2 Meeting #68, R2-097378, Jeju, Korean, Nov. 9-13, 2009, 1 page.

LTE-Advanced, "LS on Timing Advance for Carrier Aggregation in LTE-A," 3GPP TSG-RAN WG2 Meeting #67bis, R2-096267, Miyazaki, Japan, Oct. 12-16, 2009, 1 page.

3rd Generation Partnership Project; Technical Specification Group Radio Access Network; Evolved Universal Terrestrial Radio Access (E-UTRA) Radio Resource Control (RRC); Protocol specification (Release 9), 3GPP TS 36.331 V9.1.0 (Dec. 2009), 232 pages.

* cited by examiner

METHOD, DEVICE, AND SYSTEM FOR DETERMINING TIMING ADVANCE GROUPING

This application is a continuation of U.S. patent application Ser. No. 13/548,145, filed on Jul. 12, 2012, which is a continuation of International Application No. PCT/CN2011/070199, filed on Jan. 12, 2011. The International application claims priority to Chinese Patent Application No. 201010000583.X, filed on Jan. 12, 2010. The afore-mentioned patent applications are hereby incorporated by reference in their entireties.

TECHNICAL FIELD

The present invention relates to the field of communications, and in particular, to a technology for determining timing advance grouping.

BACKGROUND

In a communication system, to ensure that uplink signals sent by all UEs (User Equipment, user equipment) that are served by a base station can synchronously reach the base station, which is described in this application document by taking an evolved NodeB (eNodeB) as an example, and in an uplink transmission process, the eNodeB adjusts TA (timing advance) values for the UEs according to offset conditions of the uplink signals.

In a system that brings in a CA (carrier aggregation) feature, a UE may communicate with an eNodeB through multiple CCs (component carrier) in an uplink and a downlink, respectively. For a UE, if the eNodeB considers that these CCs may share a TA value, that is, the eNodeB adjusts the TA value only by referring to any one of uplink transmission signals in these CCs; the TA value may be used by these CCs, and these CCs are considered to belong to a TA group. Under ordinary circumstances, if one or several certain CCs among these CCs are performed signal amplification when passing through a frequency selective repeater of a certain frequency, while another one or several CCs do not pass through a repeater for signal amplification or are performed signal amplification when passing through a frequency selective repeater of another certain frequency, and when the UE falls into the coverage of one of the repeaters or falls into the coverage of two repeaters, respectively, TA values of these CCs cannot be shared, that is, these CCs do not belong to the same TA group. While if all these CCs do not pass through a repeater for amplification or they are performed signal amplification when passing through frequency selective repeaters of the same frequency, it may be considered that these CCs may share the same TA value, that is, the CCs belong to the same TA group.

For the UE and the eNodeB that support CA, when the UE enters a connection state, and the eNodeB decides to allocate more CCs for the UE, an RRC (Radio Resource Control, radio resource control) connection reconfiguration message is used to add one or multiple CCs for the UE, and related attribute information of the CC is provided in the message. When the eNodeB decides to add one or multiple CCs for the UE, the UE is required to execute a random access process on a CC every time when the CC is added, so that the eNodeB judges whether the CC can share a TA value with at least one CC of current communication.

The inventor finds that, in the prior art, every time when the CC is added, frequent random access may be caused, which causes interference in random access resources, thereby increasing conflict probability of the random access process.

SUMMARY

The present invention provides a method, a device, and a system for determining timing advance grouping, which can reduce the times of random access and lessen conflict probability of a random access process.

In one aspect, the present invention provides a method for determining timing advance grouping, where the method includes: adding, by a base station (eNodeB), a component carrier (CC) for a user equipment (UE); according to obtained timing advance (TA) group information or a preset rule, determining a TA group that the added CC belongs to, where the TA group is a set of CCs that can share a TA; and sending identification information that identifies the TA group to the UE.

In another aspect, the present invention provides a base station device, including: an adding unit, configured to add a component carrier (CC) for a user equipment (UE); a determining unit, configured to, when the adding unit adds the CC for the UE, according to obtained timing advance (TA) group information or a preset rule, determine a TA group that the added CC belongs to, where the TA group is a set of CCs that can share a TA; and a sending unit, configured to send identification information that identifies the TA group to the UE.

In still another aspect, the present invention provides a user equipment, including: a receiving unit, configured to receive information that is sent by an eNodeB and is used for querying TAs of CCs, receive information that is sent by a network management center through data of a data plane and is used for querying TAs of CCs, and receive identification information of a TA group, where the identification information is sent by the eNodeB; and a sending unit, configured to send a query result to the eNodeB, and send the query result to the network management center through a data carrier.

In still another aspect, the present invention further provides a network management center device, including: a sending unit, configured to send information for querying TAs of CCs to a UE through data of a data plane, and send TA grouping information to an eNodeB; a receiving unit, configured to receive a query result that is reported by the UE through a data carrier; and a grouping unit, configured to perform TA group grouping according to the query result, where CCs with a TA that is in a range defined by a third threshold and a fourth threshold are grouped into a TA group.

In yet another aspect, the present invention further provides a communication system, including: at least one device of the foregoing base station device, user equipment, and network management center device.

Embodiments of the present invention provide the method, the device, and the system for determining timing advance grouping. When adding the CC for the UE, according to the obtained TA group information or the preset rule, the eNodeB may determine the TA group that the added CC belongs to, thereby avoiding the case when the eNodeB frequently triggers the random access process due to uncertainty over the TA group of the added CC in the prior art. In this way, use of random access resources is reduced, the conflict probability of the random access process is lessened, and system performance is improved.

BRIEF DESCRIPTION OF THE DRAWINGS

To describe the technical solutions in the embodiments of the present invention or in the prior art more clearly, accompanying drawings required for describing the embodiments or the prior art are briefly introduced in the following. Apparently, the accompanying drawings in the following description are merely some embodiments of the present invention. Persons of ordinary skill in the art can still derive other drawings based on these accompanying drawings without creative efforts.

DETAILED DESCRIPTION OF ILLUSTRATIVE EMBODIMENTS

The technical solutions in the embodiments of the present invention are clearly and completely described in the following with reference to the accompanying drawings in the embodiments of the present invention. Apparently, the embodiments to be described are only a part of embodiments rather than all of the embodiments of the present invention. Based on the embodiments of the present invention, all other embodiments obtained by persons of ordinary skill in the art without creative efforts shall all fall within the protection scope of the present invention.

Embodiment 1

Figure 1:
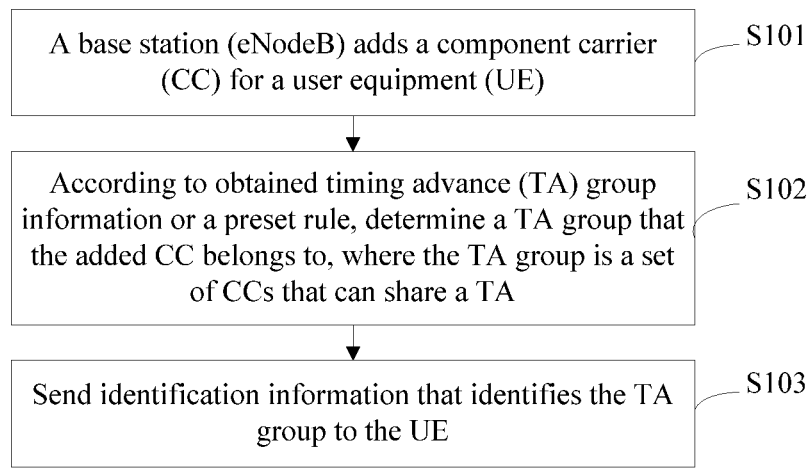
FIG. 1 is a block diagram of a method for determining timing advance grouping according to an embodiment of the present invention.

An embodiment of the present invention provides a method for determining timing advance grouping, as shown in FIG. 1, where the method includes the following content.

S101: A base station (eNodeB) adds a component carrier (CC) for a user equipment (UE).

S102: According to obtained timing advance (TA) group information or a preset rule, determine a TA group that the added CC belongs to, where the TA group is a set of CCs that can share a TA.

Specifically, the eNodeB may obtain the foregoing TA group information through the UE or a network management center, and may also judge the TA group according to a rule that is preset by a corresponding band and a repeater.

S103: Send identification information that identifies the TA group to the foregoing UE.

The embodiment of the present invention provides the method for determining timing advance grouping. After adding the CC for the UE, according to obtained TA group information or a preset rule, the eNodeB may determine the TA group that the added CC belongs to, thereby avoiding the case when the eNodeB frequently triggers a random access process due to uncertainty over the TA group of the added CC in the prior art. In this way, use of random access resources is reduced, conflict probability of the random access process is lessened, and system performance is improved.

Embodiment 2

Figure 2:
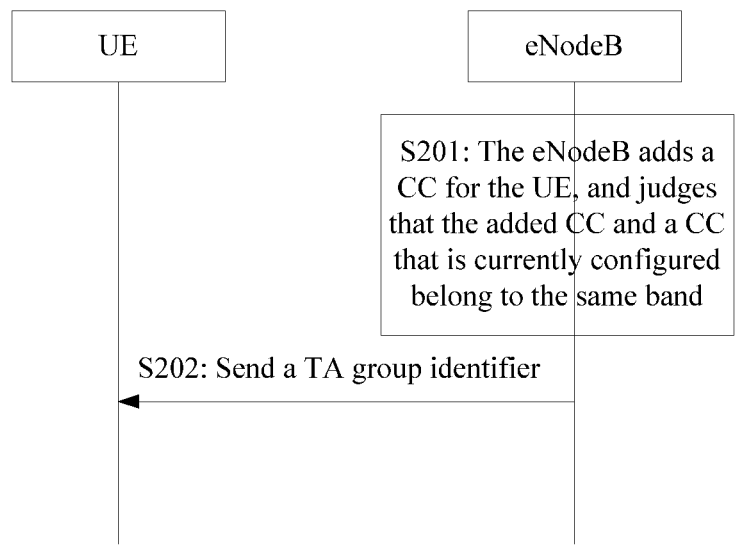
FIG. 2 is a first schematic diagram of a method for determining timing advance grouping according to an embodiment of the present invention.

An embodiment of the present invention provides a method for determining timing advance grouping, as shown in FIG. 2, where the method includes the following content.

S201: An eNodeB adds an uplink carrier CC for a UE, and judges whether the added CC and a CC that is currently configured by the eNodeB belong to a same band (Band); if they belong to the same band, the added CC is considered to belong to a TA group that corresponds to the band, and an identifier of the TA group is allocated to the CC; otherwise, a new TA group identifier is allocated for the added CC. The so-called TA group is a set of CCs that can share a TA.

It should be noted that here the TA group identifier that is referred to is identification information that is used for identifying a TA group, where the TA group identifier may be a displayed TA group number, and may also be a particular CC number in the TA group, and so on.

A group identifier is allocated for the added CC. Optionally, if the eNodeB can obtain configuration attribute information of a repeater (Repeater) that pertains to it, the eNodeB may also judge the TA group by referring to the information.

If one or multiple repeaters are deployed under an eNodeB, the eNodeB judges the TA group according to attributes of the repeaters. For example, if the eNodeB knows that the repeater that pertains to it amplifies only a band 1, it may be considered that the CCs under the band 1 can share a TA value and belong to a TA group and that the CCs under other bands that are not configured with repeaters belong to a TA group; if the eNodeB knows that a repeater 1 that pertains to it amplifies the band 1 and a repeater 2 amplifies a band 2, it is considered that the band 1 and the band 2 belong to respective TA groups, and that the CCs under other bands that are not configured with repeaters belong to a TA group; if the eNodeB knows that a repeater that pertains to it amplifies the band 1 and the band 2 at the same time, it is considered that the band 1 and the band 2 belong to a TA group, and that the CCs under other bands that are not configured with repeaters belong to a TA group.

In addition, if the eNodeB can know the case of processing delay of a repeater pertaining to the eNodeB, the eNodeB may also judge the TA group according to the case of the processing delay. For example, if the processing delay of the repeater is smaller than a definite threshold, it may be considered that the CC that does not pass through the repeater and the CC that passes through the repeater may share a TA value. And, it may be considered that all CCs belong to a TA group, and the same new TA group identifier is allocated. Information of the processing delay of the foregoing repeater is optionally applied in the foregoing method for determining the TA group.

Optionally, in the foregoing method for judging the TA group, the judgment may also be performed by using a CC as size, that is, each CC is considered to belong to a TA group; and a CC is also used as size when the attribute information of the repeater is referred to. For example, if the eNodeB knows that a repeater that pertains to it amplifies only a CC1, it may be considered that the CC1 belongs to a TA group and that other CCs that are not configured with repeaters belong to a TA group; if the eNodeB knows that a repeater 1 that pertains to it amplifies a CC1 and a repeater 2 amplifies a CC2, it is considered that the CC1 and the CC2 belong to respective TA groups, and that other CCs that are not configured with repeaters belong to a TA group; if the eNodeB knows that a repeater that pertains to it amplifies a CC1 and a CC2 at the same time, it is considered that the CC1 and the CC2 belong to a TA group, and that other CCs that are not configured with repeaters belong to a TA group.

In addition, if the eNodeB can know the case of a processing delay of a repeater pertaining to the eNodeB, the eNodeB may also judge the TA group according to the case of the processing delay. For example, if the processing delay of the repeater is smaller than a definite threshold, it may be considered that the CC that does not pass through the repeater and the CC that passes through the repeater may share a TA value. And, it may be considered that all CCs belong to a TA group, and the same new TA group identifier is allocated. Information of the processing delay of the foregoing repeater is optionally applied in the foregoing method for determining the TA group.

S202: The eNodeB sends the TA group identifier to the UE. Specifically, the eNodeB may send an RRC connection reconfiguration message to the UE, and in the RRC connection reconfiguration message, the TA group identifier is sent as an attribute parameter of the CC to the UE.

The embodiment of the present invention provides the method for determining timing advance grouping. When adding the CC for the UE, according to a preset band judging rule, the eNodeB may determine the TA group that the added CC belongs to, thereby avoiding the case when the eNodeB frequently triggers a random access process due to uncertainty over the TA group of the added CC in the prior art. In this way, use of random access resources is reduced, conflict probability of the random access process is lessened, and system performance is improved.

Embodiment 3

Figure 3:
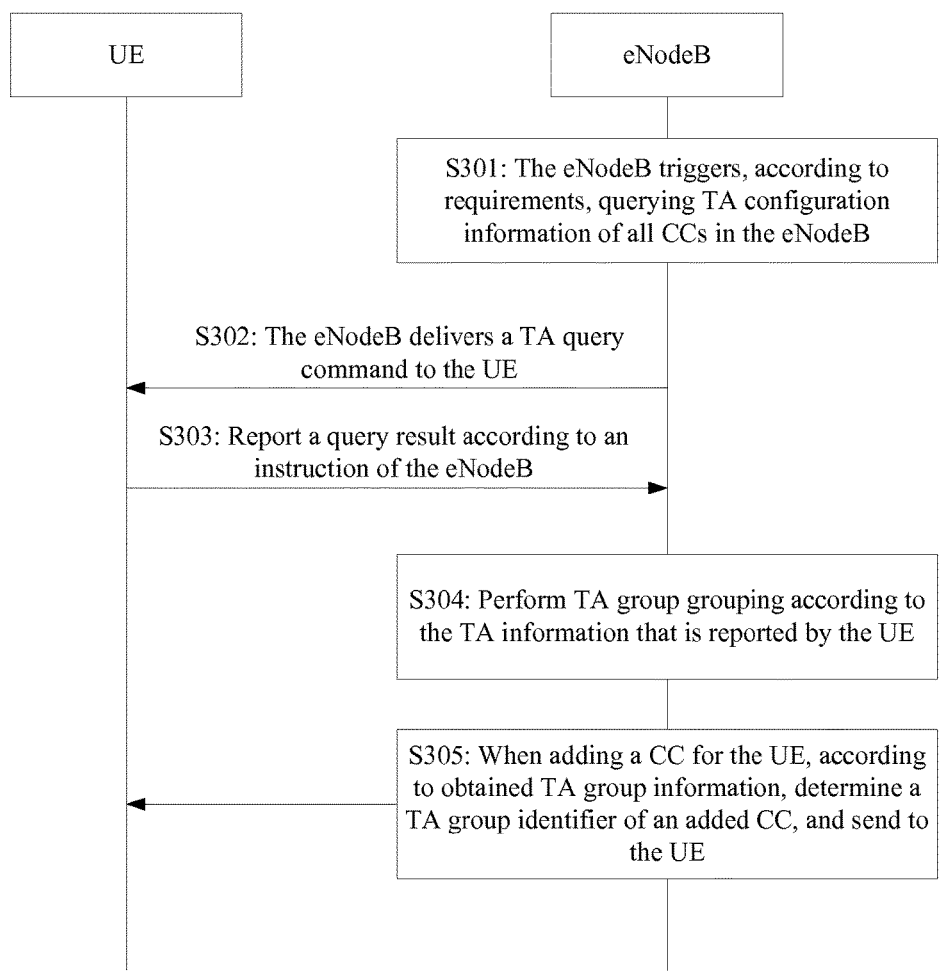
FIG. 3 is a second schematic diagram of a method for determining timing advance grouping according to an embodiment of the present invention.

An embodiment of the present invention provides a method for determining timing advance grouping, as shown in FIG. 3, where the method includes the following content.

S301: An eNodeB triggers, according to requirements, querying TA configuration information of all CCs in the eNodeB.

Triggering conditions of the eNodeB may be: human triggering, or the eNodeB obtains a change of TA information between CCs, for example, a TA difference between two CCs exceeds a definite range, by detecting uplink information of the UE in the coverage of the eNodeB, such as a channel quality indicator (Channel Quality Indicator, CQI), a sounding reference signal (Sounding Reference Signal, SRS), and so on.

In addition, a TA query command should include information required for reporting TAs of CCs.

S302: The eNodeB sends information for querying TAs of CCs to the UE.

The information may be an RRC message such as a UE information query message (UE Information Request), and may also be an MAC CE (Medium Access Control Control Element, medium access control control element). It should be noted that the message name is a name used only for convenience of description, and the name cannot limit application scope of the embodiment of the present invention, that is, there may be no similar name in some certain systems, but from this it cannot be considered that the technical solutions in the embodiment of the present invention cannot be applied to these systems.

The message may be an explicit query command, for example, requesting the UE to report a TA value of each CC, and may also be an implicit query command, for example, requesting the UE to initiate a random access process on each CC.

S303: The UE receives the TA query command and performs query, and reports a query result to the eNodeB.

Specifically, after receiving the TA query command that is sent by the eNodeB, the UE initiates random access on the requested CCs, and selects a random access preamble (preamble) on each CC, and the eNodeB detects the TA value through the random access preamble that is carried by the UE; or, after the UE receives the query command of the eNodeB, the UE decides TAs of different CCs by detecting a DL reference signal, and reports the TAs to the eNodeB.

The UE obtains TA values of different CCs through the random access process or downlink detection, and then reports the query result to the eNodeB through the RRC message such as a UE information response (UE Information Response) or the MAC CE. It should be noted that the message name is a name used only for convenience of description, and this name cannot limit the application scope of the embodiment of the present invention, that is, there may be no similar name in some certain systems, but from this it cannot be considered that the technical solutions in the embodiment of the present invention cannot be applied to these systems.

S304: The eNodeB performs TA group grouping according to the query result reported by the UE.

Specifically, if TAs of CCs reported by UEs at different positions in the coverage of the eNodeB are all within a definite numerical range, the eNodeB may consider that these CCs may belong to a TA group, that is, CCs with TAs in a range defined by a first threshold and a second threshold may be grouped into a TA group; otherwise, it is considered that these CCs do not belong to a TA group.

S305: The eNodeB adds a CC for the UE, according to TA group information obtained in step S304, the eNodeB determines a TA group identifier of the CC to be added, and in an RRC connection reconfiguration message, the eNodeB sends the TA group identifier as an attribute parameter of the CC to the UE. It should be noted that here the TA group identifier that is referred to may be a displayed TA group number, and may also be a particular CC number in the TA group.

The embodiment of the present invention provides the method for determining timing advance grouping. When adding the CC for the UE, according to the obtained TA group information, the eNodeB may determine the TA group that the added CC belongs to, thereby avoiding the case when the eNodeB frequently triggers a random access process due to uncertainty over the TA group of the added CC in the prior art. In this way, use of random access resources is reduced, conflict probability of the random access process is lessened, and system performance is improved.

Embodiment 4

Figure 4:
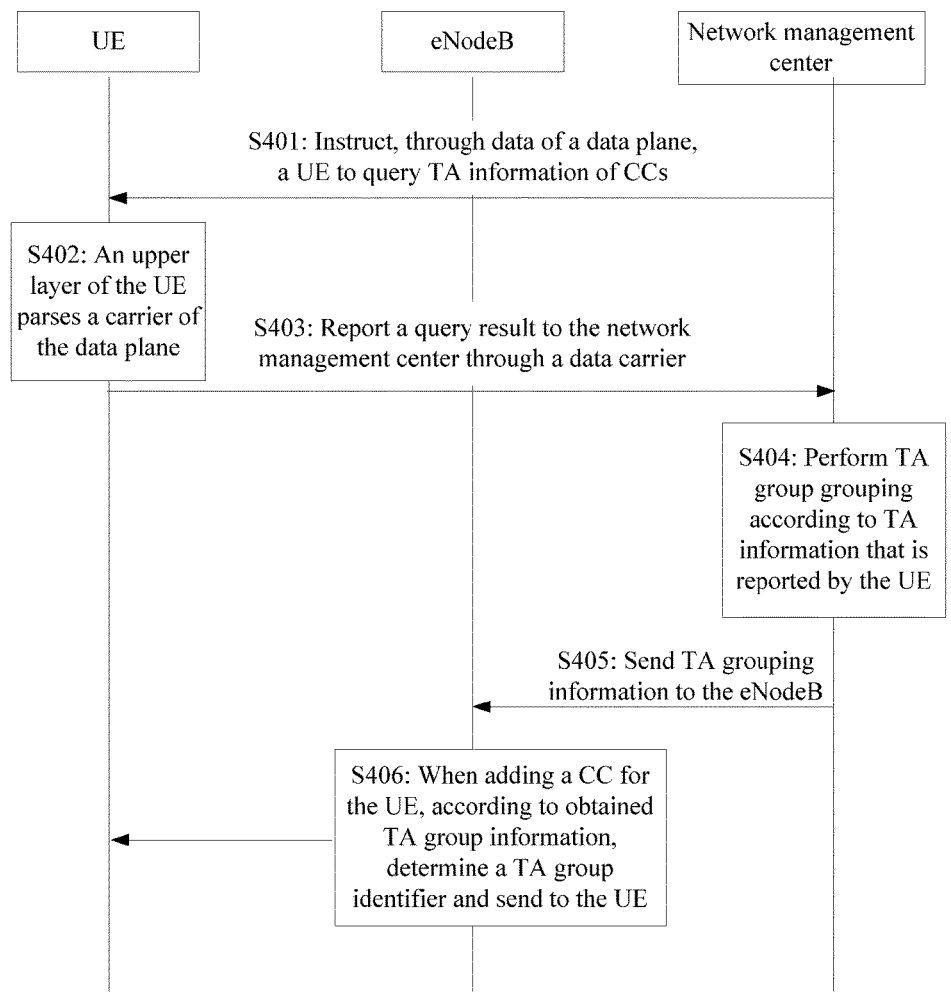
FIG. 4 is a third schematic diagram of a method for determining timing advance grouping according to an embodiment of the present invention.

An embodiment of the present invention provides a method for determining timing advance grouping, as shown in FIG. 4, where the method includes the following content.

S401: A network management center sends information for querying TAs of CCs to a UE through data of a data plane.

S402: An upper layer of the UE parses a carrier of the data plane.

Specifically, after receiving an instruction of the upper layer (an application layer), a lower layer (an MAC layer) of the UE initiates random access on the requested CCs to obtain different TA values; or after a lower layer (a physical layer) of the UE receives an instruction of the upper layer, the UE decides TAs of different CCs by detecting a DL reference signal.

The lower layer (the physical layer or the MAC layer) of the UE reports collected TA information to the upper layer (the application layer).

S403: The UE reports a query result to the network management center through a data carrier.

S404: The network management center performs TA grouping according to the query result reported by the UE.

Specifically, if TAs of CCs that are reported by UEs at different positions in CA are all within a definite numerical range, the network management center may consider that these CCs may belong to a TA group, that is, CCs with TAs in a range defined by a third threshold and a fourth threshold are grouped into a TA group; otherwise, it is considered that these CCs do not belong to a TA group.

S405: The network management center sends TA grouping configuration information to the eNodeB, and sends TA grouping information in the coverage of the network management center to the eNodeB.

Optionally, before the network management center sends the information to the eNodeB, the eNodeB may also send a TA configuration request message to the network management center to request the network management center to configure TA group information for the eNodeB. It should be noted that here the mentioned message name is a name used only for convenience of description, and this name cannot limit application scope of the embodiment of the present invention, that is, there may be no similar name in some certain systems, but from this it cannot be considered that the technical solutions in the embodiment of the present invention cannot be applied to these systems.

S406: The eNodeB adds a CC for the UE, according to the TA grouping information obtained in step S405, the eNodeB determines a TA group identifier of the CC to be added, and in an RRC connection reconfiguration message, the eNodeB sends the TA group identifier as an attribute parameter of the CC to the UE. It should be noted that here the TA group identifier that is referred to may be a displayed TA group number, and may also be a particular CC number in the TA group.

The embodiment of the present invention provides the method for determining timing advance grouping. When adding the CC for the UE, according to obtained TA group information, the eNodeB may determine the TA group that the added CC belongs to, thereby avoiding the case when the eNodeB frequently triggers a random access process due to uncertainty over the TA group of the added CC in the prior art. In this way, use of random access resources is reduced, conflict probability of the random access process is lessened, and system performance is improved.

Embodiment 5

Figure 5:
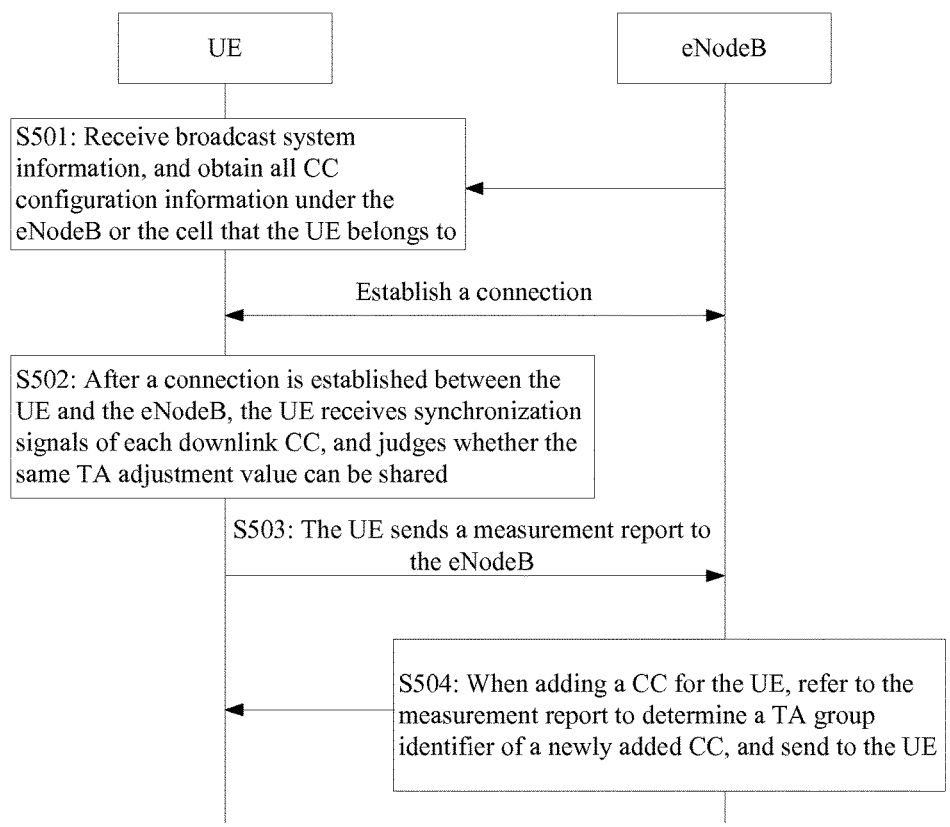
FIG. 5 is a fourth schematic diagram of a method for determining timing advance grouping according to an embodiment of the present invention.

An embodiment of the present invention provides a method for determining timing advance grouping, as shown in FIG. 5, where the method includes the following content.

S501: A UE receives system broadcast information, and obtains all CC configuration information under an eNodeB or a cell that the UE belongs to.

S502: After a connection is established between the UE and the eNodeB, the UE receives synchronization signals of each downlink CC, and judges whether corresponding uplink CCs can share the same TA adjustment value through judging time offsets between synchronizations of each downlink CC.

Specifically, it may be considered that CCs that belong to the same band may share the same TA. Therefore, the UE selects a downlink CC from different bands respectively, and makes a pairwise comparison to perform judgment of sharing a TA.

Optionally, the UE may also monitor synchronizations of downlink CCs that corresponds to all uplink CCs, and make a pairwise comparison.

S503: The UE reports a measurement report to the eNodeB, that is, the UE reports time offsets between synchronizations of the downlink CCs to the eNodeB through a synchronization report message. The synchronization report message specifically used by the UE may be a new RRC message or an added information element of an existing RRC message, and may also be a new MAC CE. The message name is a name used only for convenience of description, and this name cannot limit application scope of the embodiment of the present invention, that is, there may be no similar name in some certain systems, but from this it cannot be considered that the technical solutions in the embodiment of the present invention cannot be applied to these systems.

S504: The eNodeB adds a CC for the UE; the eNodeB refers to a measurement report result of the UE to determine a TA group identifier of the added CC, groups CCs with synchronization time offsets in the range defined by a fifth threshold and a sixth threshold into a TA group, and sends the TA group identifier as an attribute parameter of the CC to the UE through an RRC connection reconfiguration message.

It should be noted that here the TA group identifier that is referred to may be a displayed TA group number, and may also be a particular CC number in the TA group.

The embodiment of the present invention provides the method for determining timing advance grouping. When adding the CC for the UE, according to a known measurement report that is related to TA group information, the eNodeB may determine the TA group that the added CC belongs to, thereby avoiding the case when the eNodeB frequently triggers a random access process due to uncertainty over the TA group of the added CC in the prior art. In this way, use of random access resources is reduced, conflict probability of the random access process is lessened, and system performance is improved.

Embodiment 6

Figure 6:
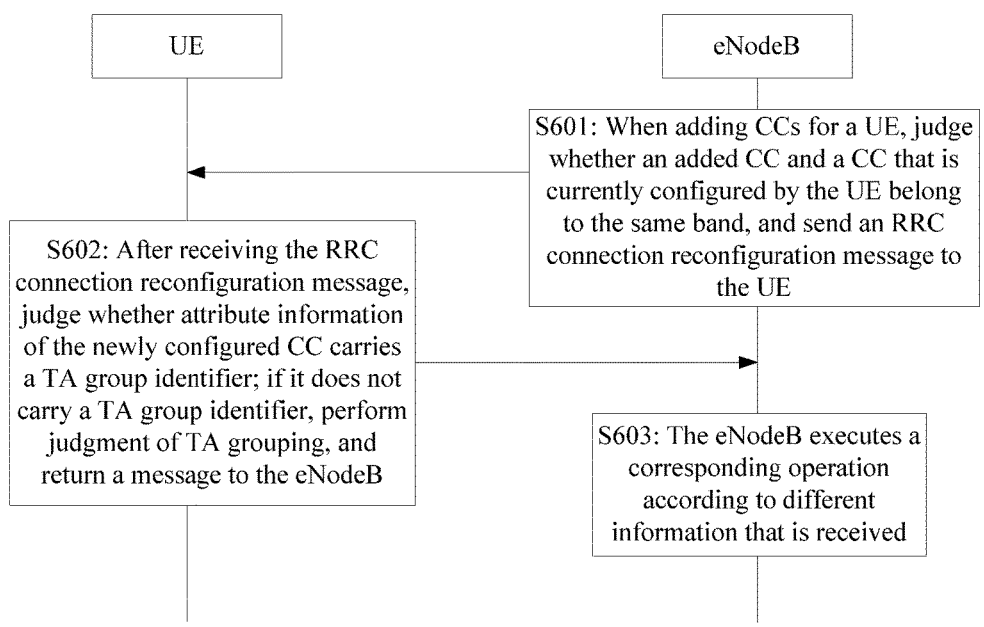
FIG. 6 is a fifth schematic diagram of a method for determining timing advance grouping according to an embodiment of the present invention.

An embodiment of the present invention provides a method for determining timing advance grouping, as shown in FIG. 6, where the method includes the following content.

S601: An eNodeB adds CCs for a UE, the eNodeB first respectively judges whether each added CC and a CC that is currently configured for the UE by the eNodeB belong to a same TA group, and sends an RRC connection reconfiguration message to the UE.

Specifically, if an added CC and a certain CC that is currently configured belong to a same band, it is considered that the CC and the CC that currently belong to the same band can share the same TA, and they belong to the same TA group. An identifier of the TA group is allocated to the CC, and the identifier of the TA group is sent as an attribute parameter of the CC to the UE through the RRC connection reconfiguration message. It should be noted that here the identifier of the TA group that is referred to may be a displayed TA group number, and may also be a particular CC number in the TA group. If the added CC and the certain CC that is currently configured do not belong to the same band, the eNodeB enables the RRC connection reconfiguration message not to carry a TA group identifier that corresponds to the CC. Optionally, the eNodeB may allocate a preamble (Preamble) or PRACH (physical random access channel) resources on the CC for the UE.

Optionally, the eNodeB may also not judge whether the added CC and the CC that is currently configured belong to the same TA group, and then the eNodeB enables the RRC connection reconfiguration message not to carry a TA group identifier that corresponds to the CC. Optionally, the eNodeB may allocate a preamble (Preamble) or PRACH (physical random access channel) resources on the CC for the UE.

S602: After receiving the RRC connection reconfiguration message of the eNodeB, the UE respectively judges whether attribute information of each CC that is newly configured carries a TA group identifier.

If the added CC carries the identifier, the identifier is stored as configuration information of the CC.

If the added CC does not carry the identifier, according to time offsets between downlink synchronizations of downlink CCs that correspond to the added CC, the UE determines whether the added CC belongs to the TA group that currently exists. Specifically, the UE may respectively compare the time offset between the downlink synchronization of the downlink CC that corresponds to the added CC and the downlink synchronization of the downlink CC that corresponds to any selected CC in each TA group that currently exists; if the offset value reaches a preset threshold, it is considered that the added CC does not belong to the TA group that the compared CC belongs to; otherwise, it is considered that it belongs to the TA group.

Afterward, if the added CC does not belong to any TA group that currently exists, the UE initiates a random access process on the added CC to the eNodeB. Specifically, if the eNodeB allocates dedicated PRACH resources and Preamble for the CC, the UE executes noncompetitive random access; otherwise, the UE executes competitive random access. If the added CC belongs to a certain current TA group, the UE sends to the eNodeB identification information of the TA group that the added CC belongs to. Specifically, in an RRC connection reconfiguration completion message, the eNodeB may be notified of the identifier of the TA group that the added CC belongs to. It should be noted that here the TA group identifier that is referred to may be a displayed TA group number and may also be a particular CC number in the TA group. Optionally, the UE may also only notify the eNodeB that the CC may share the same TA value with the CC that is currently configured, but does not report the group identifier to the eNodeB.

Optionally, after finishing sending the RRC connection reconfiguration completion message, the UE may also report the information to the eNodeB through other new RRC messages or an added information element in the existing RRC message or a new MAC CE. The message name is a name used only for convenience of description, and this name cannot limit application scope of the embodiment of the present invention, that is, there may be no similar name in some certain systems, but from this it cannot be considered that the technical solutions in the embodiment of the present invention cannot be applied to these systems.

S603: The eNodeB executes a corresponding operation according to different information that is received.

Specifically, when the eNodeB detects on the corresponding CC the random access process that is initiated by the UE, the eNodeB adjusts the TA value of the added CC through an RAR (Random Access Response, random access response) message, and allocates a corresponding new TA group identifier for the added CC through an RRC connection reconfiguration message or a new MAC CE. It should be noted that here the TA group identifier that is referred to may be a displayed TA group number, and may also be a particular CC number in the TA group. In addition, here the mentioned message name is a name used only for convenience of description, and this name cannot limit the application scope of the embodiment of the present invention, that is, there may be no similar name in some certain systems, but from this it cannot be considered that the technical solutions in the embodiment of the present invention cannot be applied to these systems.

When the eNodeB receives the RRC connection reconfiguration completion message or other added messages or the added information element in the existing message, the eNodeB stores the TA group identifier that corresponds to the CC.

The embodiment of the present invention provides the method for determining timing advance grouping. When adding the CC for the UE, according to known TA group information, the eNodeB may determine the TA group that the added CC belongs to, thereby avoiding the case when the eNodeB frequently triggers a random access process due to uncertainty over the TA group of the added CC in the prior art; when the eNodeB cannot determine TA grouping, the UE may also assist in determining TA grouping. In this way, use of random access resources is reduced, conflict probability of the random access process is lessened, and system performance is improved.

Embodiment 7

Figure 7:
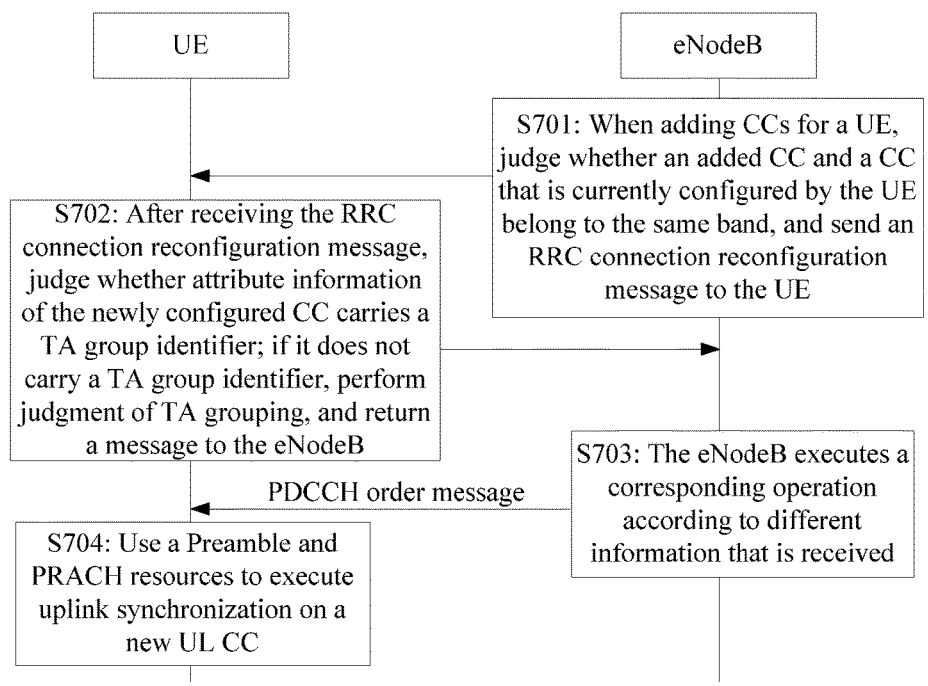
FIG. 7 is a sixth schematic diagram of a method for determining timing advance grouping according to an embodiment of the present invention.

An embodiment of the present invention provides a method for determining timing advance grouping, as shown in FIG. 7, where the method includes the following content.

S701: An eNodeB adds CCs for a UE; the eNodeB first respectively judges whether each added CC and a CC that is currently configured for the UE by the eNodeB belong to the same TA group, and sends an RRC connection reconfiguration message to the UE.

Specifically, if an added CC and a certain CC that is currently configured belong to the same band, it is considered that the CC and the CC that currently belong to the same band can share the same TA, and they belong to the same TA group. An identifier of the TA group is allocated to the CC, and the identifier of the TA group is sent as an attribute parameter of the CC to the UE through the RRC connection reconfiguration message. It should be noted that here the identifier of the TA group that is referred to may be a displayed TA group number, and may also be a particular CC number in the TA group. If the added CC and the certain CC that is currently configured do not belong to the same band, the eNodeB enables the RRC connection reconfiguration message not to carry a TA group identifier that corresponds to the CC.

Optionally, the eNodeB may also not judge whether the added CC and the CC that is currently configured belong to the same TA group, and then the eNodeB enables the RRC connection reconfiguration message not to carry the TA group identifier that corresponds to the CC.

S702: After receiving the RRC connection reconfiguration message of the eNodeB, the UE respectively judges whether attribute information of each CC that is newly configured carries a TA group identifier.

Specifically, if the added CC carries the identifier, the identifier is stored as configuration information of the CC. If the added CC does not carry the identifier, according to time offsets between downlink synchronizations of downlink CCs that correspond to the added CC, the UE determines whether the added CC belongs to the TA group that currently exists. Specifically, the UE may respectively compare the time offset between the downlink synchronization of the downlink CC that corresponds to the added CC and the downlink synchronization of the downlink CC that corresponds to any selected CC in each TA group that currently exists; if the offset value reaches a preset threshold, it is considered that the added CC does not belong to the TA group that the compared CC belongs to; otherwise, it is considered that it belongs to the TA group.

Afterward, if the added CC does not belong to any TA group that currently exists, the UE initiates a random access process on a certain CC that is currently configured, and notifies the eNodeB of all the added CC identifiers that do not belong to any current TA group; if the added CC belongs to a certain current TA group, the UE notifies, in an RRC connection reconfiguration completion message, the eNodeB of the identifier of the TA group that the added CC is in. It should be noted that here the TA group identifier that is referred to may be a displayed TA group number, and may also be a particular CC number in the TA group. Optionally, the UE may also only notify the eNodeB that the CC can share the same TA value with the CC that is currently configured, but does not report the group identifier to the eNodeB.

Optionally, after finishing sending the RRC connection reconfiguration message, the UE may also report the information to the eNodeB through other new RRC messages or an added information element in the existing RRC message or a new MAC CE. The message name is a name used only for convenience of description, and this name cannot limit application scope of the embodiment of the present invention, that is, there may be no similar name in some certain systems, but from this it cannot be considered that the technical solutions in the embodiment of the present invention cannot be applied to these systems.

S703: The eNodeB executes a corresponding operation according to different information that is received.

Specifically, when the eNodeB detects on the CC that is configured the random access process that is initiated by the UE, the eNodeB sends to the UE a preamble and physical random access channel resource information that are used by all added CCs which do not belong to any current TA group. Specifically, a PDCCH (Physical Downlink Control Channel, physical downlink control channel) order message may be sent to the UE, where the message includes the Preamble and PRACH resource information that are allocated for the UE by the eNodeB and are used on the added CCs. And a corresponding new TA group identifier is allocated for it through the RRC connection reconfiguration message or a new MAC CE. It should be noted that here the TA group identifier that is referred to may be a displayed TA group number, and may also be a particular CC number in the TA group. In addition, here the mentioned message name is a name used only for convenience of description, and this name cannot limit the application scope of the embodiment of the present invention, that is, there may be no similar name in some certain systems, but from this it cannot be considered that the technical solutions in the embodiment of the present invention cannot be applied to these systems.

Optionally, directly through the RRC connection reconfiguration message or a new MAC CE, the eNodeB may also allocate for it a corresponding new TA group identifier and the Preamble and PRACH resource information that are used on the added CC. It should be noted that here the TA group identifier that is referred to may be a displayed TA group number, and may also be a particular CC number in the TA group. In addition, here the mentioned message name is a name used only for convenience of description, and this name cannot limit the application scope of the embodiment of the present invention, that is, there may be no similar name in some certain systems, but from this it cannot be considered that the technical solutions in the embodiment of the present invention cannot be applied to these systems.

When the eNodeB receives the RRC connection reconfiguration completion message or other added messages or an added information element in the existing message, the eNodeB stores the TA group identifier that corresponds to the CC.

S704: If the UE receives dedicated random access resources that are allocated for the added CC, the UE uses the dedicated Preamble and PRACH resources to execute uplink synchronization on the added CC.

The embodiment of the present invention provides the method for determining timing advance grouping. When adding the CC for the UE, according to known TA group information, the eNodeB may determine the TA group that the added CC belongs to, thereby avoiding the case when the eNodeB frequently triggers a random access process due to uncertainty over the TA group of the added CC in the prior art; when the eNodeB cannot determine TA grouping, the UE may also assist in determining TA grouping. In this way, use of random access resources is reduced, conflict probability of the random access process is lessened, and system performance is improved.

Embodiment 8

Figure 8:
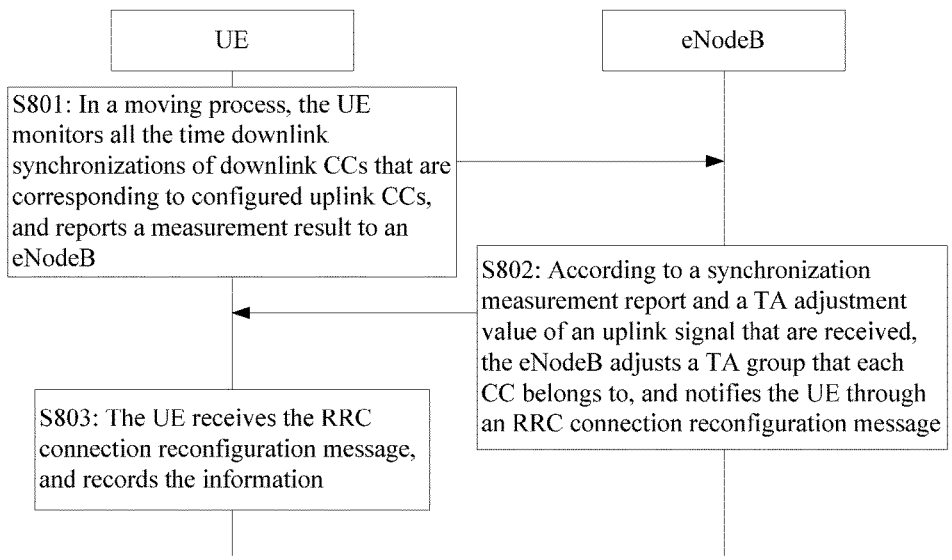
FIG. 8 is a seventh schematic diagram of a method for determining timing advance grouping according to an embodiment of the present invention.

An embodiment of the present invention provides a method for determining timing advance grouping, as shown in FIG. 8, where the method includes the following content.

S801: In a moving process, a UE monitors all the time downlink synchronizations of downlink CCs that correspond to configured uplink CCs, and reports a measurement result to an eNodeB.

Specifically, for CCs that belong to the same TA group, the UE makes a pairwise comparison of time offsets between synchronizations of downlink CCs that correspond to uplink CCs of each band. Specifically, the UE may select a downlink CC that corresponds to any uplink CC from each band to perform monitoring, and may also monitor downlink CCs that correspond to all uplink CCs that are configured. The time offsets between the downlink synchronizations are made a pairwise comparison; if an offset difference reaches a preset threshold and lasts a period, the UE selects any CC from the two bands respectively to initiate a random access process. Optionally, the UE stores but does not immediately apply a TA adjustment value that is received from an RAR message, and sends the used measurement report information to the eNodeB in a random access Msg3 message.

For CCs that belong to different TA groups, the UE makes a pairwise comparison of time offsets between synchronizations of downlink CCs that correspond to uplink CCs of each TA group. Specifically, the UE may select the downlink CC that corresponds to any uplink CC from each TA group to perform monitoring, and may also monitor the downlink CCs that correspond to all uplink CCs that are configured. The time offsets between the downlink synchronizations are made a pairwise comparison; if an offset difference is smaller than a preset threshold and lasts a period, where the threshold and the previous threshold may be the same threshold, and may also be different thresholds, the UE sends a dedicated synchronization report message to the eNodeB, and sends the used measurement report information to the eNodeB. The synchronization report message that is specifically used by the UE may be a new RRC message or an added information element of an existing RRC message, and may also be a new MAC CE. The message name is a name used only for convenience of description, and this name cannot limit application scope of the embodiment of the present invention, that is, there may be no similar name in some certain systems, but from this it cannot be considered that the technical solutions in the embodiment of the present invention cannot be applied to these systems.

Optionally, the foregoing monitoring and judging action performed in the same TA group and different TA groups may also take a CC as a unit, that is, the UE measures synchronizations of downlink CCs that correspond to all CCs that are configured and makes a pairwise comparison. Other judging rules and subsequent processes are the same as the foregoing manner.

When the UE is configured with only one CC or the UE does not support CA, the UE monitors a synchronization offset of the downlink CC that corresponds to the UE. If the synchronization offset changes abruptly and reaches or exceeds a preset threshold, and no TA Command MAC CE that is sent by the eNodeB is received for performing adjustment, and its TAT (Timing Advance Timer, TA timer) does not expire, when the UE needs to send uplink data, the UE first initiates a random access process on the CC. Specifically, the uplink data includes the data sent on a PUSCH (Physical uplink share channel, physical uplink shared channel), and also includes the data sent on a PUCCH (Physical uplink control channel, physical uplink control channel). And a current TA value is adjusted according to the TA adjustment value that is received in the RAR message.

S802: According to a synchronization measurement report and the TA adjustment value of an uplink signal, the eNodeB adjusts a TA group that each CC belongs to. Specifically, in the measurement result, if a difference between a timing advance of CCs of a band and timing advances of CCs of other bands in the same TA group reaches a seventh threshold, the TA group that the CCs of the band belong to is adjusted, and reallocates a new TA group for the CCs of the band; if among all TA groups, a difference between a timing advance of CCs of a TA group and timing advances of CCs of other TA groups is smaller than an eighth threshold, the eNodeB adjusts the TA group that the CCs of the TA group belong to, and combines the CCs that originally belong to the two TA groups into one TA group.

Optionally, the foregoing process in which the eNodeB compares the timing advances of CCs may also take a CC as a unit, that is, judgment is performed according to the measure result; if a difference between a timing advance of a certain CC and timing advances of other CCs in the same TA group reaches the seventh threshold, the TA group that the CC belongs to is adjusted, and reallocates a new TA group for the CC; if among all TA groups, a difference between a timing advance of CCs of a TA group and timing advances of CCs of other TA groups is smaller than the eighth threshold, the eNodeB adjusts the TA group that the CCs of the TA group belong to, and combines the CCs that originally belong to the two TA groups into one TA group.

If the eNodeB agrees to adjust the grouping, the eNodeB sends an updated TA group identifier to the UE through an RRC connection reconfiguration message. It should be noted that here the TA group identifier that is referred to may be a displayed TA group number, and may also be a particular CC number in the TA group.

S803: The UE receives the RRC connection reconfiguration message, and records the information.

If the UE stores the TA adjustment value that is received from the RAR message, the TA adjustment value is applied.

The method for determining timing advance grouping, where the method is provided in this embodiment, may be performed after the eNodeB adds a CC for the UE in the foregoing embodiment, that is, after the CC is added, the UE judges whether an existing CC changes.

The embodiment of the present invention provides the method for determining timing advance grouping. Because the UE monitors all the time the CC that is configured, the eNodeB can obtain change conditions of a TA group in time in a communication process, thereby avoiding deterioration that is of the quality of uplink transmission signals and is caused by improper adjustment of a TA value, and avoiding decrease of system throughput.

Embodiment 9

Figure 9:
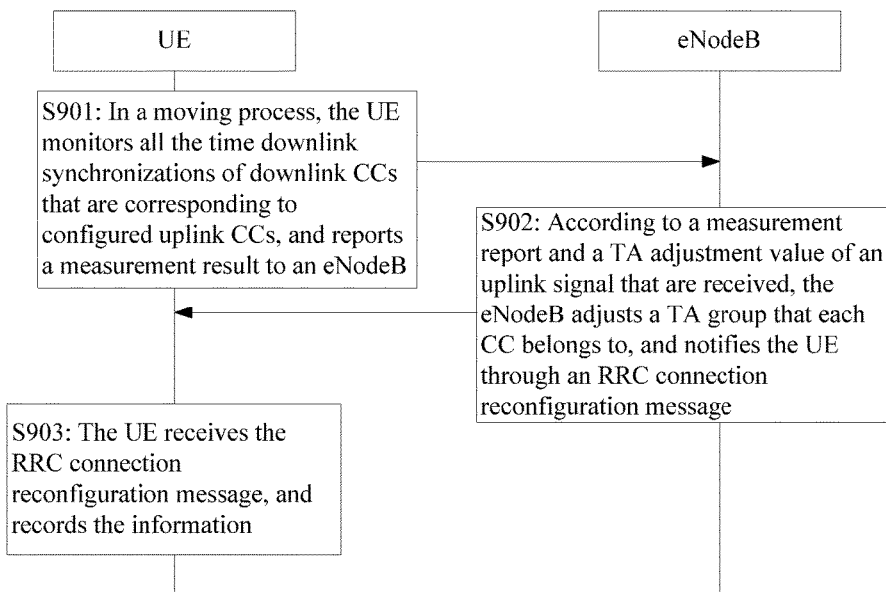
FIG. 9 is an eighth schematic diagram of a method for determining timing advance grouping according to an embodiment of the present invention.

An embodiment of the present invention provides a method for determining timing advance grouping, as shown in FIG. 9, where the method includes the following content.

S901: In a moving process, a UE monitors all the time downlink synchronizations of downlink CCs that correspond to configured uplink CCs, and reports a measurement result to an eNodeB.

Specifically, for CCs that belong to the same TA group, the UE makes a pairwise comparison of time offsets between synchronizations of downlink CCs that correspond to uplink CCs of each band. Specifically, the UE may select a downlink CC that corresponds to any uplink CC from each band to perform monitoring, and may also monitor the downlink CCs that correspond to all uplink CCs that are configured. The time offsets between the downlink synchronizations are made a pairwise comparison; if an offset difference reaches a preset threshold and lasts a period, the UE sends a dedicated synchronization report message to the eNodeB, and sends used measurement report information to the eNodeB. The synchronization report message that is specifically used by the UE may be a new RRC message or an added information element of an existing RRC message, and may also be a new MAC CE. The message name is a name used only for convenience of description, and this name cannot limit application scope of the embodiment of the present invention, that is, there may be no similar name in some certain systems, but from this it cannot be considered that the technical solutions in the embodiment of the present invention cannot be applied to these systems.

For CCs that belong to different TA groups, the UE makes a pairwise comparison of time offsets between synchronizations of downlink CCs that correspond to uplink CCs of each TA group. Specifically, the UE may select the downlink CC that corresponds to any uplink CC from each TA group to perform monitoring, and may also monitor the downlink CCs that correspond to all uplink CCs that are configured. The time offsets between the downlink synchronizations are made a pairwise comparison; if an offset difference is smaller than a preset threshold and lasts a period, where the threshold and the previous threshold may be the same threshold, and may also be different thresholds, the UE sends a dedicated synchronization report message to the eNodeB, and sends the used measurement report information to the eNodeB. The synchronization report message that is specifically used by the UE may be a new RRC message or an added information element of an existing RRC message, and may also be a new MAC CE. The message name is a name used only for convenience of description, and this name cannot limit the application scope of the embodiment of the present invention, that is, there may be no similar name in some certain systems, but from this it cannot be considered that the technical solutions in the embodiment of the present invention cannot be applied to these systems.

Optionally, the foregoing monitoring and judging action performed in the same TA group and different TA groups may also take a CC as a unit, that is, the UE measures synchronizations of downlink CCs that correspond to all CCs that are configured and makes a pairwise comparison. Other judging rules and subsequent processes are the same as the foregoing manner.

S902: The eNodeB receives a synchronization measurement report and a TA adjustment value of an uplink signal, and adjusts a TA group that each CC belongs to. Specifically, in the measure result, if a difference between a timing advance of CCs of a band and timing advances of CCs of other bands in the same TA group reaches a seventh threshold, the eNodeB adjusts the TA group that the CCs of the band belong to, and reallocates a new TA group for the CCs of the band; if among all TA groups, a difference between a timing advance of CCs of a TA group and timing advances of CCs of other TA groups is smaller than an eighth threshold, the eNodeB adjusts the TA group that the CCs of the TA group belong to, and combines the CCs that originally belong to the two TA groups into one TA group.

Optionally, the foregoing process in which the eNodeB compares the timing advances of CCs may also take a CC as a unit, that is, judgment is performed according to the measure result; if a difference between a timing advance of a certain CC and timing advances of other CCs in the same TA group reaches the seventh threshold, the eNodeB adjusts the TA group that the CC belongs to, and reallocates a new TA group for the CC; if among all TA groups, a difference between a timing advance of CCs of a TA group and timing advances of CCs of other TA groups is smaller than the eighth threshold, the eNodeB adjusts the TA group that the CCs of the TA group belong to, and combines the CCs that originally belong to the two TA groups into one TA group.

If the eNodeB agrees to adjust the grouping, the eNodeB sends an updated TA group identifier to the UE through an RRC connection reconfiguration message. It should be noted that here the TA group identifier that is referred to may be a displayed TA group number, and may also be a particular CC number in the TA group. If it is considered to be necessary, the eNodeB instructs that a random access process is executed on one or several certain CCs. Optionally, the eNodeB may also allocate a Preamble and PRACH resources that need to use for the UE, and instructs the UE to initiate a random access process on a certain CC. The Preamble and PRACH resources may be carried in the RRC connection reconfiguration message, and may also be indicated subsequently by a PDCCH order message.

S903: If receiving the RRC connection reconfiguration message, the UE records the information. If the random access process is required, the UE executes the random access process on the CC according to an instruction of the eNodeB: If the dedicated Preamble and PRACH resources are allocated, the UE executes a noncompetitive random access process; otherwise, the UE executes a competitive random access process.

The method for determining timing advance grouping, where the method is provided in this embodiment, may be performed after the eNodeB adds a CC for the UE in the foregoing embodiment, that is, after the CC is added, the UE judges whether an existing CC changes.

The embodiment of the present invention provides the method for determining timing advance grouping. Because the UE monitors all the time the CC that is configured, the eNodeB can obtain change conditions of a TA group in time in a communication process, thereby avoiding deterioration that is of the quality of uplink transmission signals and is caused by improper adjustment of a TA value, and avoiding decrease of system throughput.

Embodiment 10

Figure 10:
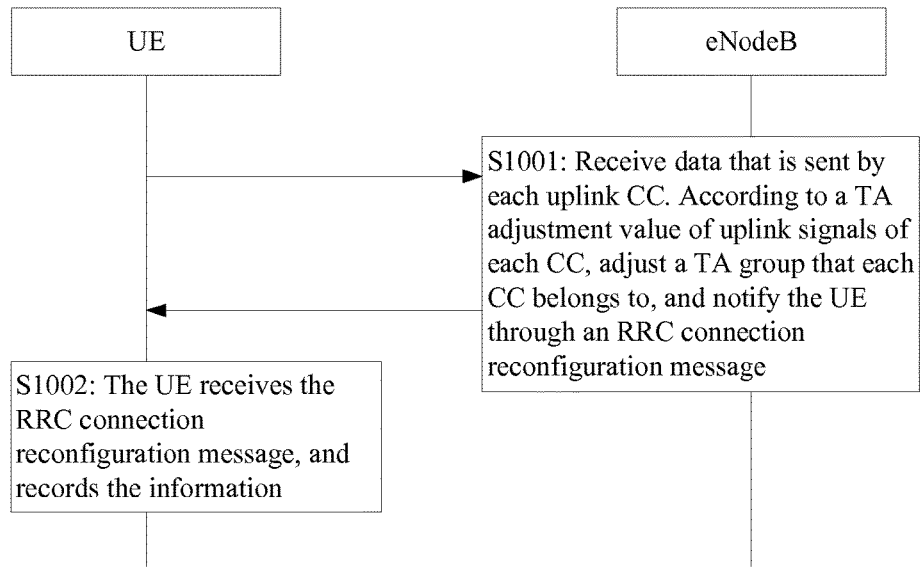
FIG. 10 is a ninth schematic diagram of a method for determining timing advance grouping according to an embodiment of the present invention.

An embodiment of the present invention provides a method for determining timing advance grouping, as shown in FIG. 10, where the method includes the following content.

S1001: An eNodeB receives data that is sent through each uplink CC, and according to a TA adjustment value of uplink data of each CC, adjusts a TA group that each CC belongs to. The eNodeB judges whether it is necessary to reallocate a new TA group for the CCs of the band, or combines the CCs that originally belong to two TA groups into one TA group.

If necessary, the eNodeB sends an updated TA group identifier to a UE through an RRC connection reconfiguration message. It should be noted that here the TA group identifier that is referred to may be a displayed TA group number, and may also be a particular CC number in the TA group. If it is considered to be necessary, the eNodeB instructs that a random access process is executed on one or several certain CCs. Optionally, the eNodeB may also allocates a Preamble and PRACH resources that need to use for the UE, and instructs the UE to initiate a random access process on a certain CC. The Preamble and PRACH resources may be carried in the RRC connection reconfiguration message, and may also be indicated subsequently by a PDCCH order message.

S1002: The UE receives the RRC connection reconfiguration message, and records the information. If the random access process is required, the UE executes the random access process on the CC according to an instruction of the eNodeB: If the dedicated Preamble and PRACH resources are allocated, the UE executes a noncompetitive random access process; otherwise, the UE executes a competitive random access process.

The method for determining timing advance grouping, where the method is provided in this embodiment, may be performed after the eNodeB adds a CC for the UE in the foregoing embodiment, that is, after the CC is added, the UE judges whether an existing CC changes.

The embodiment of the present invention provides the method for determining timing advance grouping. Because the eNodeB receives data that is sent by each uplink CC, respectively, the eNodeB can obtain change conditions of a TA group in time in a communication process, thereby avoiding deterioration that is of the quality of uplink transmission signals and is caused by improper adjustment of a TA value, and avoiding decrease of system throughput.

Figure 11:
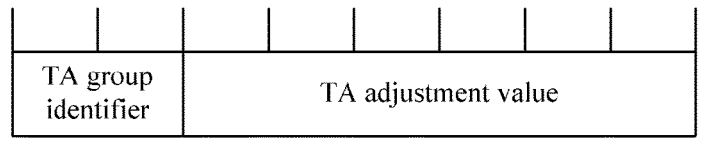
FIG. 11 is a schematic diagram of a format of an extended TA Command MAC CE according to an embodiment of the present invention.

In addition, in the foregoing each embodiment, when the eNodeB needs to perform TA adjustment for multiple TA groups of the UE, an added extended TA Command MAC CE is used, where the TA group identifier described in the present invention is used to differentiate, that is, after receiving the extended TA Command MAC CE, the UE judges the TA group identifier, and applies a subsequent TA adjustment value to the CCs in the TA group. A format of the extended TA Command MAC CE is shown in FIG. 11.

In addition, in the foregoing each embodiment, for a certain UE, when CCs of multiple bands belong to one TA group, when the UE initiates a random access process in a scene other than a scene of triggering random access in the foregoing embodiments, the UE selects a random access channel of a CC with a lowest frequency of the band, from random access channels of each CC that is configured, to initiate a random access process.

Figure 12:
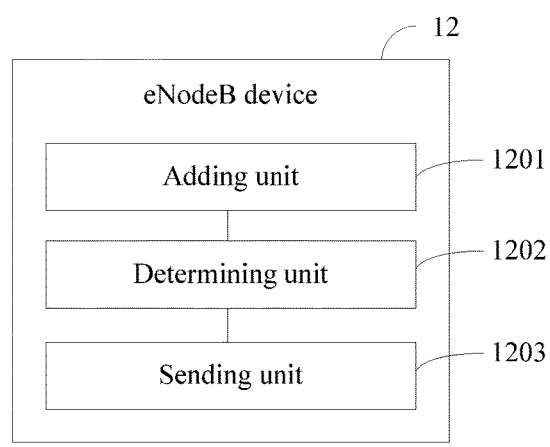
FIG. 12 is a first structural block diagram of an eNodeB device according to an embodiment of the present invention.

An eNodeB device 12 provided in an embodiment of the present invention, as shown in FIG. 12, includes: an adding unit 1201, a determining unit 1202, and a sending unit 1203. The foregoing adding unit 1201 is configured to add a component carrier (CC) for a user equipment (UE). The foregoing determining unit 1202 is configured to determine, when the foregoing adding unit 1201 adds the CC for the UE, according to obtained timing advance (TA) group information or a preset rule, a TA group that the added CC belongs to, where the TA group is a set of CCs that can share a TA. The foregoing sending unit 1203 is configured to send identification information that identifies the TA group to the UE.

When adding the CC for the UE, according to the obtained TA group information or the preset rule, the eNodeB device provided in the embodiment of the present invention may determine the TA group that the added CC belongs to, thereby avoiding the case when the eNodeB frequently triggers a random access process due to uncertainty over the TA group of the added CC in the prior art. In this way, use of random access resources is reduced, conflict probability of the random access process is lessened, and system performance is improved.

Further, the foregoing sending unit 1203 may be further configured to send information for querying TAs of CCs to the UE.

Figure 13:
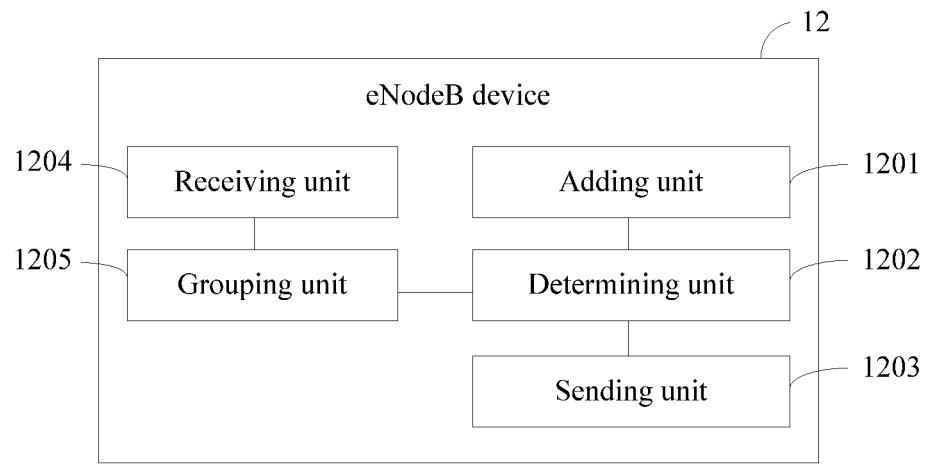
FIG. 13 is a second structural block diagram of an eNodeB device according to an embodiment of the present invention.

Optionally, as shown in FIG. 13, the eNodeB device 12 further includes a receiving unit 1204 and a grouping unit 1205.

The foregoing receiving unit 1204 is configured to receive a query result that is reported by the UE, receive TA grouping information sent by a network management center, receive a measurement report that is sent by the UE and includes time offsets which are between synchronizations of downlink CCs and are measured by the UE, and receive data that is sent through each uplink CC. The foregoing grouping unit 1205 is configured to perform TA group grouping according to the query result, where CCs with TAs in a range that is defined by a first threshold and a second threshold are grouped into a TA group.

Figure 14:
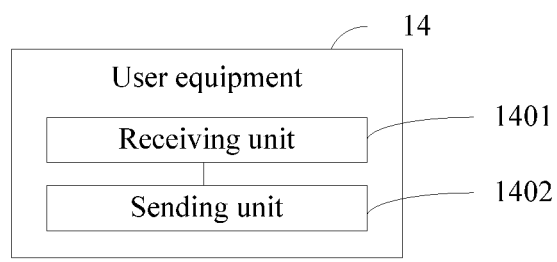
FIG. 14 is a first structural block diagram of a user equipment according to an embodiment of the present invention.

A user equipment 14 provided in an embodiment of the present invention, as shown in FIG. 14, includes a receiving unit 1401 and a sending unit 1402.

The foregoing receiving unit 1401 is configured to receive information that is sent by an eNodeB and is used for querying TAs of CCs, receive information that is sent by a network management center through data of a data plane and is used for querying TAs of CCs, and receive identification information of a TA group, where the identification information is sent by the eNodeB. The foregoing sending unit 1402 is configured to send a query result to the eNodeB, and send the query result to the network management center through a data carrier.

The user equipment provided in the embodiment of the present invention can send TA information of each CC to the eNodeB, so that the eNodeB obtains TA group information and determines a TA group that an added CC belongs to, thereby avoiding the case when the eNodeB frequently triggers a random access process due to uncertainty over the TA group of the added CC in the prior art. In this way, use of random access resources is reduced, conflict probability of the random access process is lessened, and system performance is improved.

Figure 15:
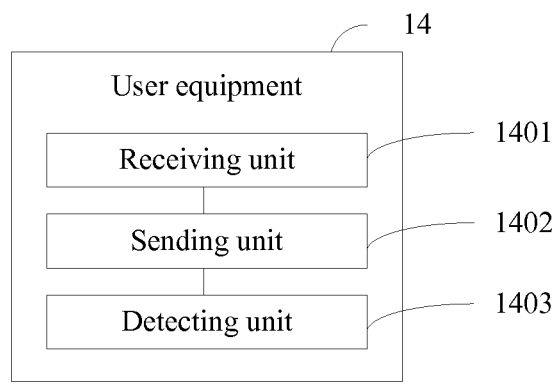
FIG. 15 is a second structural block diagram of a user equipment according to an embodiment of the present invention.

Further, as shown in FIG. 15, the user equipment 14 may further include: a detecting unit 1403. The detecting unit 1403 is configured to detect downlink synchronizations of downlink CCs that correspond to each configured uplink CC. The foregoing sending unit 1402 is further configured to report a measurement result that is obtained by the detecting unit 1403 to the eNodeB.

In this way, it is beneficial for the eNodeB to obtain change conditions of a TA group in time in a communication process, thereby avoiding deterioration that is of the quality of uplink transmission signals and is caused by improper adjustment of a TA value, and avoiding decrease of system throughput.

Figure 16:
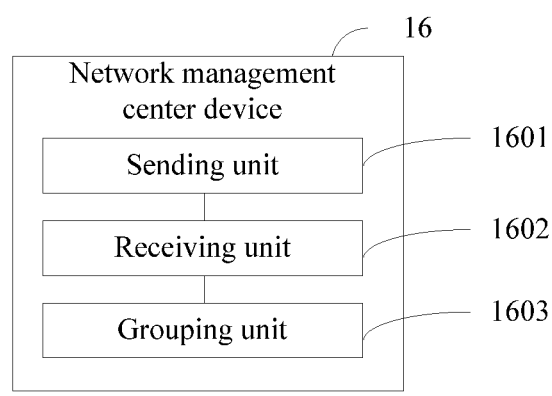
FIG. 16 is a structural block diagram of a network management center device according to an embodiment of the present invention.

A network management center device 16 provided in an embodiment of the present invention, as shown in FIG. 16, includes: a sending unit 1601, a receiving unit 1602, and a grouping unit 1603.

The foregoing sending unit 1601 is configured to send information for querying TAs of CCs to a UE through data of a data plane, and send TA grouping information to an eNodeB. The foregoing receiving unit 1602 is configured to receive a query result that is reported by the UE through a data carrier. The foregoing grouping unit 1603 is configured to perform TA group grouping according to the query result, where CCs with TAs in a range defined by a third threshold and a fourth threshold are grouped into a TA group.

The network management center device provided in the embodiment of the present invention can send TA information of each CC to the eNodeB, so that the eNodeB obtains TA group information and determines a TA group that an added CC belongs to, thereby avoiding the case when the eNodeB frequently triggers a random access process due to uncertainty over the TA group of the added CC in the prior art. In this way, use of random access resources is reduced, conflict probability of the random access process is lessened, and system performance is improved.

A communication system provided in an embodiment of the present invention includes at least one of the base station device, the user equipment, and the network management center device in the foregoing embodiments.

Because each device is the same as that in the foregoing embodiment, repeated descriptions are not given here again.

The embodiment of the present invention provides the communication system. When adding a CC for a UE, according to obtained TA group information or a preset rule, an eNodeB may determine a TA group that the added CC belongs to, thereby avoiding the case when the eNodeB frequently triggers a random access process due to uncertainty over the TA group of the added CC in the prior art. In this way, use of random access resources is reduced, conflict probability of the random access process is lessened, and system performance is improved.

The foregoing descriptions are only specific embodiments of the present invention, but are not intended to limit the protection scope of the present invention. Any change or replacement that may be easily thought of by those skilled in the art within the technical scope disclosed by the present invention shall fall within the protection scope of the present invention. Therefore, the protection scope of the present invention shall be subject to the protection scope of the claims.

What is claimed is:

1. A method for determining timing advance grouping, the method comprising:
    adding, by a base station, a component carrier (CC) for a user equipment (UE);
    determining, by the base station when the CC is added, a timing advance (TA) group to which the added CC belongs, wherein the TA group is a set of CCs that can share a TA; and
    sending, by the base station, identification information that identifies the TA group to the UE.

2. The method according to claim 1, further comprising sending, by the base station, a TA command medium access control control element (MAC CE) to the UE when performing TA adjustment, wherein the TA command MAC CE comprises the identification information and a TA adjustment value.

3. The method according to claim 1, wherein sending the identification information comprises sending the identification information in a radio resource control (RRC) connection reconfiguration message.

4. The method according to claim 1, wherein determining the TA group in which the added CC belongs comprises:
    when the added CC and a CC that is currently configured on the base station belong to a same band, determining that the added CC belongs to a TA group that corresponds to the band.

5. The method according to claim 1, wherein, before the base station adds the CC for the UE, the method further comprises:
    sending, by the base station, information for querying TAs of CCs to the UE;
    receiving, by the base station, a query result that is reported by the UE; and
    performing, by the base station, TA grouping according to the query result, wherein CCs with TAs in a range that is defined by a first threshold and a second threshold are grouped into a TA group.

6. The method according to claim 1, wherein, before the base station adds the CC for the UE, the method further comprises receiving, by the base station, TA grouping information that is sent by a network management center, wherein the TA grouping information comprises TA grouping that is performed by the network management center according to a query result that is fed back by the UE, wherein CCs with TAs in a range that is defined by a third threshold and a fourth threshold are grouped into a TA group.

7. The method according to claim 1, wherein determining the TA group to which the added CC belongs comprises:
    receiving, by the base station, a measurement report that is sent by the UE, wherein the measurement report comprises a time offset which is between synchronizations of downlink CCs and is measured by the UE; and
    determining, by the base station and according to the measurement report, the TA group to which the added CC belongs, wherein in the measurement report, CCs with a synchronization time offset in a range that is defined by a fifth threshold and a sixth threshold are grouped into a TA group.

8. The method according to claim 1, further comprising:
    receiving, by the base station, a measurement result that is sent by the UE, wherein the measurement result, detected by the UE, comprises a time offset between downlink synchronizations of downlink CCs that correspond to each uplink CC that is configured by the UE; and
    adjusting, by the base station and according to the measurement result and a TA adjustment value of an uplink signal, a TA group to which each CC belongs.

9. The method according to claim 1, further comprising:
    receiving, by the base station, data that is sent through each uplink CC, and according to a TA adjustment value of uplink data of each CC, adjusting a TA group to which each CC belongs; and
    sending, by the base station, identification information that identifies a new TA group to the UE.

10. A base station device, comprising a processing hardware platform executing instructions stored on a non-transitory computer-readable storage medium, wherein the instructions are executed to cause the device to:
    add a component carrier (CC) for a user equipment (UE);
    determine, when the CC is added, a timing advance (TA) group to which the added CC belongs, wherein the TA group is a set of CCs that can share a TA; and
    send identification information that identifies the TA group to the UE.

11. The device according to claim 10, wherein the instructions are executed to further cause the device to send a TA command medium access control control element (MAC CE) to the UE when performing TA adjustment, wherein the TA command MAC CE comprises the identification information and a TA adjustment value.

12. The device according to claim 10, wherein the identification information is sent as an attribute parameter of the CC for the UE in a radio resource control (RRC) connection reconfiguration message.

13. The device according to claim 10, wherein when the added CC and a CC that is currently configured on the base station belong to a same band, the added CC belonging to a TA group that corresponds to the band.

14. The device according to claim 10, wherein the instructions are executed to, before the device adds the CC for the UE, cause the device further to:
send information for querying TAs of CCs to the UE;
receive a query result that is reported by the UE; and
perform TA grouping according to the query result, wherein CCs with TAs in a range that is defined by a first threshold and a second threshold are grouped into a TA group.

15. The device according to claim 10, wherein the instructions are executed to, before the device adds the CC for the UE, cause the device further to receive TA grouping information that is sent by a network management center, wherein the TA grouping information comprises TA grouping that is performed by the network management center according to a query result that is fed back by the UE, wherein CCs with TAs in a range that is defined by a third threshold and a fourth threshold are grouped into a TA group.

16. The device according to claim 10, wherein the instructions are executed to cause the device to perform the following processes to determine the TA group to which the added CC belongs:
receive a measurement report that is sent by the UE, wherein the measurement report comprises a time offset that is between synchronizations of downlink CCs and is measured by the UE; and
determine, according to the measurement report, the TA group to which the added CC belongs, wherein in the measurement report, CCs with a synchronization time offset in a range that is defined by a fifth threshold and a sixth threshold are grouped into a TA group.

17. The device according to claim 10, wherein the instructions are executed to further cause the device to:
receive a measurement result that is sent by the UE, wherein the measurement result, detected by the UE, comprises a time offset between downlink synchronizations of downlink CCs that correspond to each uplink CC that is configured by the UE; and
adjust, according to the measurement result and a TA adjustment value of an uplink signal, a TA group to which each CC belongs.

18. The device according to claim 10, wherein the instructions are executed to further cause the device to:
receive data that is sent through each uplink CC, and according to a TA adjustment value of uplink data of each CC, adjusting a TA group to which each CC belongs; and
send identification information that identifies a new TA group to the UE.

19. A user equipment (UE), comprising a processing hardware platform executing instructions stored on a non-transitory computer-readable storage medium, wherein the instructions are executed which cause the UE to:
receive a radio resource control (RRC) connection reconfiguration message sent by a base station, wherein the RRC connection reconfiguration message is used to add a component carrier (CC) for the UE and comprises identification information of a TA group to which the added CC belongs;
obtain the identification information of the TA group to which the added CC belongs, wherein the identification information of the TA group is determined and sent by the base station when the CC is added for the UE and the TA group is a set of CCs that can share a TA; and
store the identification information as configuration information of the CC.

20. The UE according to claim 19, wherein the instructions are executed to further cause the UE to:
receive a TA command medium access control control element (MAC CE) sent by the base station, wherein the TA command MAC CE comprises the identification information and a TA adjustment value;
obtain the identification information; and
apply the TA adjustment value to CCs in the TA group identified by identification information.

21. The UE according to claim 19, wherein the identification information is obtained from the RRC connection reconfiguration message.

* * * * *